(12) United States Patent
Miller et al.

(10) Patent No.: US 12,276,229 B2
(45) Date of Patent: Apr. 15, 2025

(54) METHOD OF OPERATING A TURBINE ENGINE HAVING A BLEED SYSTEM

(71) Applicant: General Electric Company, Schenectady, NY (US)

(72) Inventors: Brandon W. Miller, Middletown, OH (US); Geoffrey Whitener, Cincinnati, OH (US); Jeffrey D. Clements, Mason, OH (US); Patrick Marrinan, Cincinnati, OH (US); Andrew J. Hank, Maineville, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/463,800

(22) Filed: Sep. 8, 2023

(65) Prior Publication Data
US 2025/0084797 A1 Mar. 13, 2025

(51) Int. Cl.
F02C 9/18 (2006.01)

(52) U.S. Cl.
CPC .......... F02C 9/18 (2013.01); *F05D 2260/606* (2013.01); *F05D 2270/3061* (2013.01)

(58) Field of Classification Search
CPC ...... F02C 7/32; F02C 7/36; F02C 6/08; F02C 9/18; B64D 2013/0603; B64D 2013/0607
See application file for complete search history.

(56) References Cited

U.S. PATENT DOCUMENTS

| | | | |
|---|---|---|---|
| 8,388,308 B2 * | 3/2013 | Karafillis | F01D 17/105 |
| | | | 415/169.1 |
| 8,397,487 B2 | 3/2013 | Sennoun et al. | |
| 8,677,761 B2 | 3/2014 | Leach et al. | |
| 8,955,794 B2 | 2/2015 | Mackin et al. | |
| 8,967,528 B2 | 3/2015 | Mackin et al. | |
| 9,765,700 B2 | 9/2017 | Mackin et al. | |
| 10,626,879 B2 | 4/2020 | Schwarz et al. | |
| 10,794,295 B2 | 10/2020 | Schwarz | |
| 11,459,906 B2 * | 10/2022 | Ortiz | F01D 17/145 |

(Continued)

FOREIGN PATENT DOCUMENTS

| | | |
|---|---|---|
| CN | 114570162 A | 6/2022 |
| EP | 2987967 A1 | 2/2016 |

(Continued)

*Primary Examiner* — Thuyhang N Nguyen
(74) *Attorney, Agent, or Firm* — Venable LLP; Griffin A. A. Deadwick; Michele V. Frank

(57) ABSTRACT

A method of operating a turbine engine. The turbine engine includes a high-pressure compressor including a high-pressure compressor flowpath and a plurality of stages, and a bleed system. The bleed system includes a plurality of bleed flowpaths including a first bleed flowpath from one stage of the plurality of stages and a second bleed flowpath from another stage of the plurality of stages. The method includes directing compressed air through the high-pressure compressor flowpath, directing a first portion of the compressed air through the first bleed flowpath, the first portion of the compressed air having a first mass flow, directing a second portion of the compressed air through the second bleed flowpath, determining an altitude of the turbine engine, and changing the first mass flow of the first portion of the compressed air through the first bleed flowpath based on the altitude of the turbine engine.

19 Claims, 5 Drawing Sheets

(56) References Cited

U.S. PATENT DOCUMENTS

| | | | |
|---|---|---|---|
| 11,499,479 B2 | 11/2022 | Gould et al. | |
| 11,603,796 B2 | 3/2023 | Diosady et al. | |
| 2011/0056210 A1* | 3/2011 | Griffin | F02C 9/18 |
| | | | 60/773 |
| 2013/0164115 A1 | 6/2013 | Sennoun | |
| 2014/0271113 A1 | 9/2014 | Khalid et al. | |
| 2015/0233292 A1* | 8/2015 | Pelagatti | F02C 6/04 |
| | | | 60/785 |
| 2015/0275758 A1 | 10/2015 | Foutch et al. | |
| 2015/0354464 A1* | 12/2015 | Hillel | F04D 27/0261 |
| | | | 415/144 |
| 2017/0254274 A1 | 9/2017 | Thomas, Jr. et al. | |
| 2017/0268430 A1 | 9/2017 | Schwarz | |
| 2017/0268431 A1 | 9/2017 | Schwarz | |
| 2018/0057171 A1 | 3/2018 | Sautron | |
| 2018/0347401 A1 | 12/2018 | Nolcheff et al. | |
| 2019/0145420 A1* | 5/2019 | Schwarz | F01D 17/105 |
| | | | 415/145 |
| 2020/0331615 A1* | 10/2020 | Sautron | B64D 13/06 |
| 2021/0348564 A1* | 11/2021 | Mackin | F02C 7/047 |
| 2022/0153420 A1* | 5/2022 | Prieto Padilla | B64D 13/06 |
| 2022/0235707 A1* | 7/2022 | Millhaem | F01D 25/12 |
| 2023/0332539 A1 | 10/2023 | Subramanian et al. | |
| 2023/0399978 A1 | 12/2023 | Witlicki et al. | |

FOREIGN PATENT DOCUMENTS

| | | |
|---|---|---|
| GB | 2168760 A | 6/1986 |
| GB | 2580128 A | 7/2020 |

\* cited by examiner

METHOD OF OPERATING A TURBINE ENGINE HAVING A BLEED SYSTEM

TECHNICAL FIELD

The present disclosure relates generally to turbine engines having bleed systems, for example, for high-pressure compressors of the turbine engines.

BACKGROUND

Turbine engines, for example, for an aircraft, generally include a fan and a core section arranged in flow communication with one another. The core section includes a high-pressure compressor. Some turbine engines include a bleed system at the high-pressure compressor to extract or to "bleed" air from the high-pressure compressor to be used at various other locations in the turbine engine or the aircraft.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
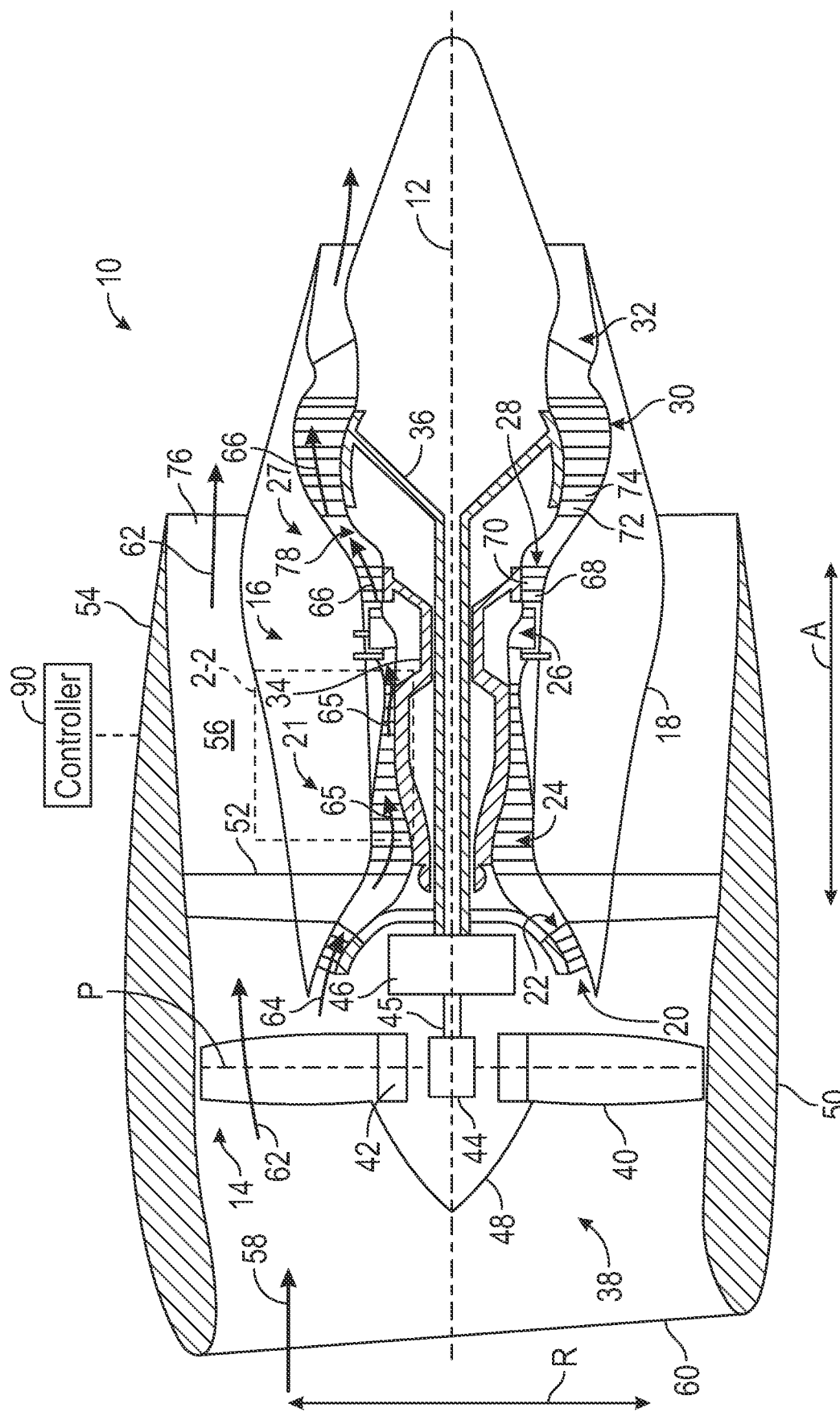
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "successive stages" of a plurality of stages of a high-pressure (HP) compressor are two or more stages that follow in order or are in an uninterrupted sequence. For example, successive stages can include a first stage and a second stage, a second stage and a third stage, a third stage and a fourth stage, and so on.

Turbine engines, for example, for aircraft, can include bleed systems for bleeding air from a compressor section of the turbine engine. The bleed air is used for cooling components of the turbine engine (e.g., at least one of a high-pressure turbine or a low-pressure turbine) and of the aircraft (e.g., at least one of an environmental control system or a wing anti-icing system). The bleed air is typically bled off from various stages of the HP compressor. In some bleed systems, the bleed air from one stage is used for both the aircraft systems and the low-pressure turbine. In bleed systems, the air is typically bled from upstream stages of the HP compressor in order to avoid sacrificing performance of the HP compressor. For example, the further downstream the air is bled (e.g., more downstream stages), the more the bleed system reduces performance of the HP compressor. Using the same bleed air for both the aircraft systems and the low-pressure turbine requires the bleed air to be bled from downstream stages (e.g., a fourth stage) of the HP compressor in order to provide the bleed air at a sufficient pressure to both the aircraft systems and the low-pressure turbine. Bleeding air from an upstream stage (e.g., a third stage) of the HP compressor would help to reduce the related fuel burn penalty (e.g., reduce an amount that the performance of the HP compressor is reduced). However, bleeding air from three stages of a nine stage HP compressor may provide insufficient pressure to purge the low-pressure turbine at all operating conditions. Therefore, hot gas path ingestion of the hot gases through the rotor discs and into the cavities of the low-pressure turbine may occur. The hot gas path ingestion can lead to premature component durability issues and even failure of the components of the turbine engine.

Accordingly, the present disclosure provides for an improved bleed system for a turbine engine. The bleed system includes three bleed flowpaths from three stages of the HP compressor. At least two of the bleed flowpaths are at successive stages of the HP compressor (e.g., the third stage and the fourth stage) to provide high efficiency bleed air to the aircraft systems (e.g., at least one of the environmental control system or the wing anti-icing system). Providing at least two of the bleed flowpaths at successive stages in such a way allows for the bleed system to meet the required back flow margins and the low-pressure turbine pressure ratio requirements for a particular turbine engine.

The bleed system of the present disclosure provides for a flexible seal and a rigid support member for separating bleed plenums of the bleed system such that the bleed flowpaths are all separate from each other. The bleed flowpaths include a first bleed flowpath to the aircraft systems, a second bleed flowpath to the low-pressure turbine, and a third bleed flowpath to a high-pressure turbine of the turbine engine. In the exemplary embodiment, the first bleed flowpath is at the third stage, the second bleed flowpath is at the fourth stage, and the third bleed flowpath is at a sixth stage of the HP compressor. In some embodiments, the bleed system includes a fourth bleed flowpath downstream of a diffuser of the HP compressor and upstream of a combustor of the turbine engine. Bleeding air off of the third stage to provide air to an aircraft environmental control system (ECS) or to a wing anti-icing system (WAI) of the aircraft allows for a lower performance penalty or a lower fuel burn penalty. The present disclosure provides for bleeding air from the fourth stage of the HP compressor to maintain positive back flow margin in the low-pressure turbine to purge the low-pressure turbine and prevent the hot gas path ingestion in the low-pressure turbine. Therefore, the HP compressor bleed system of the present disclosure provides bleed air to the aircraft from the third stage of the HP compressor to provide a lower fuel burn penalty (e.g., as compared to bleed systems without the benefit of the present disclosure), while maintaining durability and safety with a positive back flow margin provided by the higher pressure air from the fourth stage of the HP compressor.

In some embodiments, the bleed air from the third stage is directed to the low-pressure turbine and the bleed air from the fourth stage is directed to the ECS or the WAI. Accordingly, the present disclosure provides for separating the bleed air to the ECS or the WAI and the low-pressure turbine by bleeding air from different stages of the HP compressor. Such a configuration allows for independent control of the bleed air to the ECS or the WAI and to the low-pressure turbine. The present disclosure also provides for a method of operating the turbine engine to vary the amount of the bleed air to the ECS or the WAI based on an altitude of the turbine engine. Varying the amount of the bleed air to the ECS or the WAI based on the altitude of the turbine engine helps to achieve a desired amount of the bleed air to the ECS or the WAI, while also reducing an amount of the compressed air that needs to be bled from the HP compressor due to the separate flowpaths to the ECS or the WAI and to the low-pressure turbine, as compared to turbine engines without the benefit of the present disclosure. Accordingly, varying the amount of the bleed air to the ECS or the WAI based on the altitude of the turbine engine helps to reduce an amount of performance sacrificed of the HP compressor by bleeding the air from the HP compressor.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low-pressure (LP) compressor 22 followed downstream by a high-pressure (HP) compressor 24, a combustion section 26, a turbine section 27 including a high-pressure (HP) turbine 28 followed downstream by a low-pressure (LP) turbine 30, and a jet exhaust nozzle section 32. A high-pressure (HP) shaft 34 or spool drivingly connects the HP turbine 28 to the HP compressor 24 to rotate the HP turbine 28 and the HP compressor 24 in unison. A low-pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison, as detailed further below. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy and kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

A controller 90 is in communication with the turbine engine 10 for controlling aspects of the turbine engine 10. For example, the controller 90 is in two-way communication with the turbine engine 10 for receiving signals from various sensors and control systems of the turbine engine 10 and for controlling components of the turbine engine 10, as detailed further below. The controller 90, or components thereof, may be located onboard the turbine engine 10, onboard the aircraft, or can be located remote from each of the turbine engine 10 and the aircraft. The controller 90 can be a Full Authority Digital Engine Control (FADEC) that controls aspects of the turbine engine 10.

The controller 90 may be a standalone controller or may be part of an engine controller to operate various systems of the turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
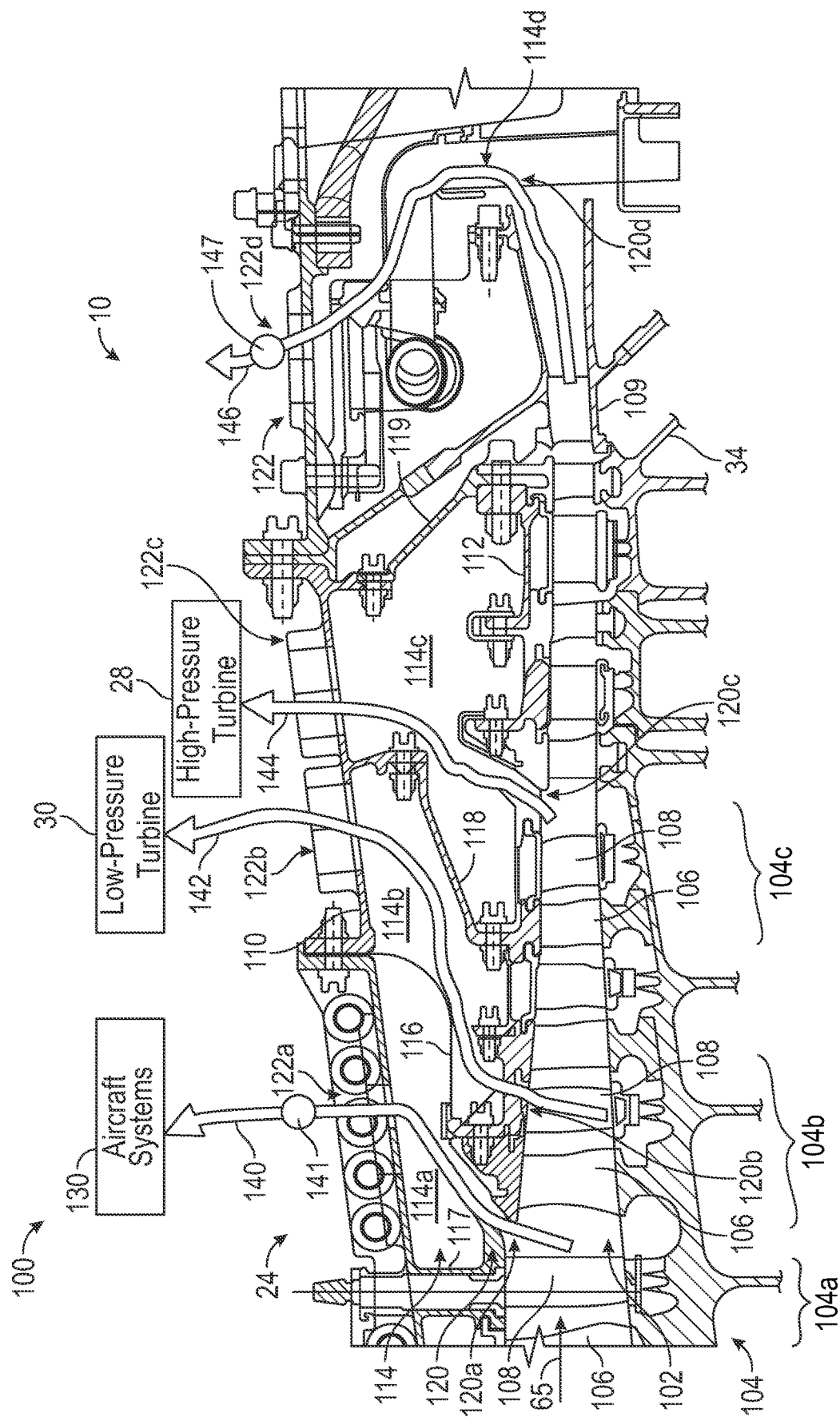
FIG. 2 is a schematic, cross-sectional view of a high-pressure compressor of the turbine engine of FIG. 1, taken at detail 2-2 in FIG. 1, according to the present disclosure.

FIG. 2 is a schematic, cross-sectional view of a portion of the HP compressor 24 with a bleed system 100, taken at detail 2-2 in FIG. 1, according to the present disclosure. The HP compressor 24 includes an HP compressor flowpath 102 and a plurality of stages 104 of HP compressor rotor blades 106 and HP compressor stator vanes 108. The HP compressor 24 includes at least three stages 104. For example, the HP compressor 24 includes nine stages 104 (only seven stages 104 are shown in FIG. 2, and two upstream stages are out of the view of FIG. 2). Each stage 104 is defined by a respective HP compressor rotor blade 106 and a respective HP compressor stator vane 108. The HP compressor 24 includes an outer HP compressor casing 110 (e.g., forming a part of the outer casing 18 in FIG. 1) and an inner HP compressor casing 112 spaced radially inward of the outer HP compressor casing 110.

The HP compressor stator vanes 108 are coupled to the inner HP compressor casing 112 and are static components. The HP compressor rotor blades 106 are coupled to the HP shaft 34, thereby rotating with rotation of the HP shaft 34. In this way, the HP compressor 24 further compresses the compressed air 65 as the compressed air 65 flows through the HP compressor flowpath 102 from an upstream portion of the HP compressor 24 to a downstream portion of the HP compressor 24. The compressed air 65 then passes an HP compressor diffuser 109 that directs the compressed air 65 into the combustion section 26 (FIG. 1).

The bleed system 100 includes one or more bleed plenums 114, a flexible seal 116, and a rigid support member 118. The one or more bleed plenums 114 are defined between the outer HP compressor casing 110 and the inner HP compressor casing 112. The one or more bleed plenums 114 are annular about the longitudinal centerline axis 12 (FIG. 1). The flexible seal 116 is disposed in the one or more bleed plenums 114 and extends from the inner HP compressor casing 112 to the outer HP compressor casing 110. The flexible seal 116 is annular about the longitudinal centerline axis 12 (FIG. 1) and axially and fluidly splits the one or more bleed plenums 114 into a plurality of bleed plenums 114.

The flexible seal 116 accommodates relative motion between two of the bleed plenums 114, while maintaining a substantially hermetic seal between the two bleed plenums 114 so that the bleed plenums 114 are fluidically separate volumes. The flexible seal 116 can be made of any metallic flexible seal material that is resistant to temperatures up to at least 1000° F., such as, by way of non-limiting example, a titanium alloy (e.g., titanium 6-2 or titanium 17), a nickel-chromium alloy (e.g., Inconel® 718), steel, or the like. In some embodiments, the flexible seal 116 includes a bellows or other spring-like features such that the flexible seal 116 is mechanically compliant.

The rigid support member 118 provides primary mechanical support to the HP compressor flowpath 102. The rigid support member 118 is disposed in the one or more bleed plenums 114 and extends from the inner HP compressor casing 112 to the outer HP compressor casing 110. In this way, the rigid support member 118 supports the inner HP compressor casing 112. The rigid support member 118 is annular about the longitudinal centerline axis (FIG. 1) and axially and fluidly splits the one or more bleed plenums 114 into a plurality of bleed plenums 114.

The flexible seal 116 and the rigid support member 118 split the one or more bleed plenums 114 into three bleed plenums 114 including a first bleed plenum 114*a*, a second bleed plenum 114*b*, and a third bleed plenum 114*c*. The first bleed plenum 114*a* is defined by the inner HP compressor casing 112, the outer HP compressor casing 110, the flexible seal 116, and a forward support member 117. The second bleed plenum 114*b* is defined by the inner HP compressor casing 112, the outer HP compressor casing 110, the flexible seal 116, and the rigid support member 118. The third bleed plenum 114*c* is defined by the inner HP compressor casing 112, the outer HP compressor casing 110, the rigid support member 118, and an aft support member 119. The second bleed plenum 114*b* is aft of the first bleed plenum 114*a*, and the third bleed plenum 114*c* is aft of the second bleed plenum 114*b*. The one or more bleed plenums 114 also includes a fourth bleed plenum 114*d*, also referred to as a post diffuser flowpath, that is defined between the inner HP compressor casing 112 and the outer HP compressor casing 110 axially aft of the HP compressor diffuser 109.

The bleed system 100 also includes a plurality of bleed ports 120 and a plurality of bleed outlets 122 in fluid communication with the one or more bleed plenums 114. The plurality of bleed ports 120 are disposed through the inner HP compressor casing 112 and provide fluid communication from the HP compressor flowpath 102 to the one or more bleed plenums 114. The plurality of bleed outlets 122 are disposed through the outer HP compressor casing 110 and provide fluid communication from the one or more bleed plenums 114 to at least one of one or more turbine engine systems (e.g., the LP turbine 30, the HP turbine 28, or the like) or one or more aircraft systems 130, such as, for example, an environmental control system (ECS) or a wing anti-icing (WAI) system. In this way, a portion of the compressed air 65 is bled from the HP compressor flowpath 102, through the plurality of bleed ports 120, through the one or more bleed plenums 114, through the plurality of bleed outlets 122, and to the at least one of the one or more turbine engine systems or the one or more aircraft systems, as detailed further below.

The plurality of bleed ports 120 include a first bleed port 120*a*, a second bleed port 120*b*, and a third bleed port 120*c*. The plurality of bleed outlets 122 include a first bleed outlet 122*a*, a second bleed outlet 122*b*, and a third bleed outlet 122*c*. The first bleed port 120*a* and the first bleed outlet 122*a* are in fluid communication with the first bleed plenum 114*a* and define a first bleed flowpath 140. The second bleed port 120*b* and the second bleed outlet 122*b* are in fluid communication with the second bleed plenum 114*b* and define a second bleed flowpath 142. The third bleed port 120*c* and the third bleed outlet 122*c* are in fluid communication with the third bleed plenum 114*c* and define a third bleed flowpath 144. Accordingly, the bleed system 100 includes a plurality of bleed flowpaths 140, 142, and 144 including at least the three bleed flowpaths 140, 142, and 144. In some embodiments, the plurality of bleed ports 120 include a fourth bleed port 120*d*, and the plurality of bleed outlets 122 include a fourth bleed outlet 122*d*. The fourth bleed port 120*d* and the fourth bleed outlet 122*d* are in fluid communication with the fourth bleed plenum 114*d* (e.g., the post diffuser flowpath) and define a fourth bleed flowpath 146.

The first bleed port 120*a* is in fluid communication with a third stage 104*a* of the HP compressor 24 (a first stage and a second stage of the HP compressor 24 are not shown in the view of FIG. 2). The second bleed port 120*b* is in fluid communication with a fourth stage 104*b* of the HP compressor 24. The third bleed port 120*c* is in fluid communication with a sixth stage 104*c* of the HP compressor 24. In this way, the first bleed port 120*a* (e.g., the first bleed flowpath 140) and the second bleed port 120*b* (e.g., the second bleed flowpath 142) are located at successive stages 104 of the HP compressor 24. Accordingly, at least two of the bleed flowpaths 140, 142, and 144 are located at successive stages 104 of the HP compressor 24.

A size and a location (e.g., at a particular stage 104) of the plurality of bleed ports 120 and the plurality of bleed outlets 122 are selected such that the first bleed flowpath 140 recovers more than 10% of the dynamic pressure of the first bleed flowpath 140 into a static pressure within the first bleed flowpath 140. For example, the first bleed port 120*a* is a slot that converts more than 10% of the dynamic pressure of the first bleed flowpath 140 into static pressure within first bleed plenum 114*a*. In this way, the first bleed flowpath 140 is a high efficiency bleed flowpath such that the first bleed flowpath 140 provides the highest pressure possible without having to utilize more fuel burn by moving to a more downstream stage 104. Further, a size and a location of the plurality of bleed ports 120 and the plurality of bleed outlets 122 are selected such that a pressure ratio of a total pressure of the second bleed flowpath 142 ($P_{second\_bleed}$) to a total pressure of the first bleed flowpath 140 ($P_{first\_bleed}$) is less than a pressure ratio of the stage 104 at which the second bleed flowpath 142 is located. In this way, the first bleed flowpath 140 is more efficient than the second bleed flowpath 142 and provides for a shorter length of the HP compressor 24. In some embodiments, the first bleed flowpath 140 is as efficient as the second bleed flowpath 142 or is less efficient than the second bleed flowpath 142.

A size and a location (e.g., at a particular stage 104) of the plurality of bleed ports 120 and the plurality of bleed outlets 122 are selected such that the second bleed flowpath 142 recovers less than 10% of the dynamic pressure of the second bleed flowpath 142 into a static pressure within the second bleed flowpath 142. For example, the second bleed port 120*b* is a hole that is aligned perpendicular to the HP compressor flowpath 102 and that converts less than 10% of the dynamic pressure of the second bleed flowpath 142 into static pressure within the second bleed plenum 114b. Such a configuration provides for a second bleed flowpath recovery ratio (e.g., a ratio of the total pressure at the exit of the second bleed port 120b to the total pressure in the HP compressor flowpath 102 at the fourth stage 104b) at the second bleed flowpath 142 that is lower than a first bleed flowpath recovery ratio (e.g., a ratio of the total pressure at the exit of the first bleed port 120a to the total pressure in the HP compressor flowpath 102 at the third stage 104a) of the first bleed flowpath 140.

The first bleed flowpath 140 includes a first bleed flowpath valve 141 and the fourth bleed flowpath 146 includes a fourth bleed flowpath valve 147. The first bleed flowpath valve 141 is a modulating valve that can be fully opened, fully closed, or positioned between fully opened and fully closed. The first bleed flowpath valve 141 can be any type of modulating valve, such as, for example, a globe valve, a disc valve, a butterfly valve, a ball valve, or the like. In this way, the first bleed flowpath valve 141 is controlled to modulate (e.g., vary) an amount of bleed air through the first bleed flowpath 140 to the one or more aircraft systems 130, as detailed further below with respect to FIG. 4. The first bleed flowpath valve 141 is positioned in the first bleed flowpath 140 radially outward of the outer HP compressor casing 110. The first bleed flowpath valve 141 can be positioned in the first bleed flowpath 140 anywhere along the first bleed flowpath 140. For example, the first bleed flowpath valve 141 can be positioned within the first bleed port 120a, within the first bleed plenum 114a, or anywhere along the first bleed flowpath 140.

The fourth bleed flowpath valve 147 includes any type of valve that can be controlled to open to allow bleed air to flow through the fourth bleed flowpath 146 and to close to prevent the bleed air from flowing through the fourth bleed flowpath 146, as detailed further below. The fourth bleed flowpath valve 147 is positioned in the fourth bleed flowpath 146 radially outward of the outer HP compressor casing 110. The fourth bleed flowpath valve 147 can be positioned in the fourth bleed flowpath 146 anywhere along the fourth bleed flowpath 146. For example, the fourth bleed flowpath valve 147 can be positioned within the fourth bleed port 120d, within the fourth bleed plenum 114d (e.g., the post diffuser flowpath), or anywhere along the fourth bleed flowpath 146. In some embodiments, the second bleed flowpath 142 includes a second bleed flowpath valve that is a modulating valve. In some embodiments, the third bleed flowpath 144 includes a third bleed flowpath valve (not shown) that includes a modulating valve. In this way, an amount of the second portion of the compressed air 65 or an amount of the third portion of the compressed air 65 can also be changed.

Figure 3:
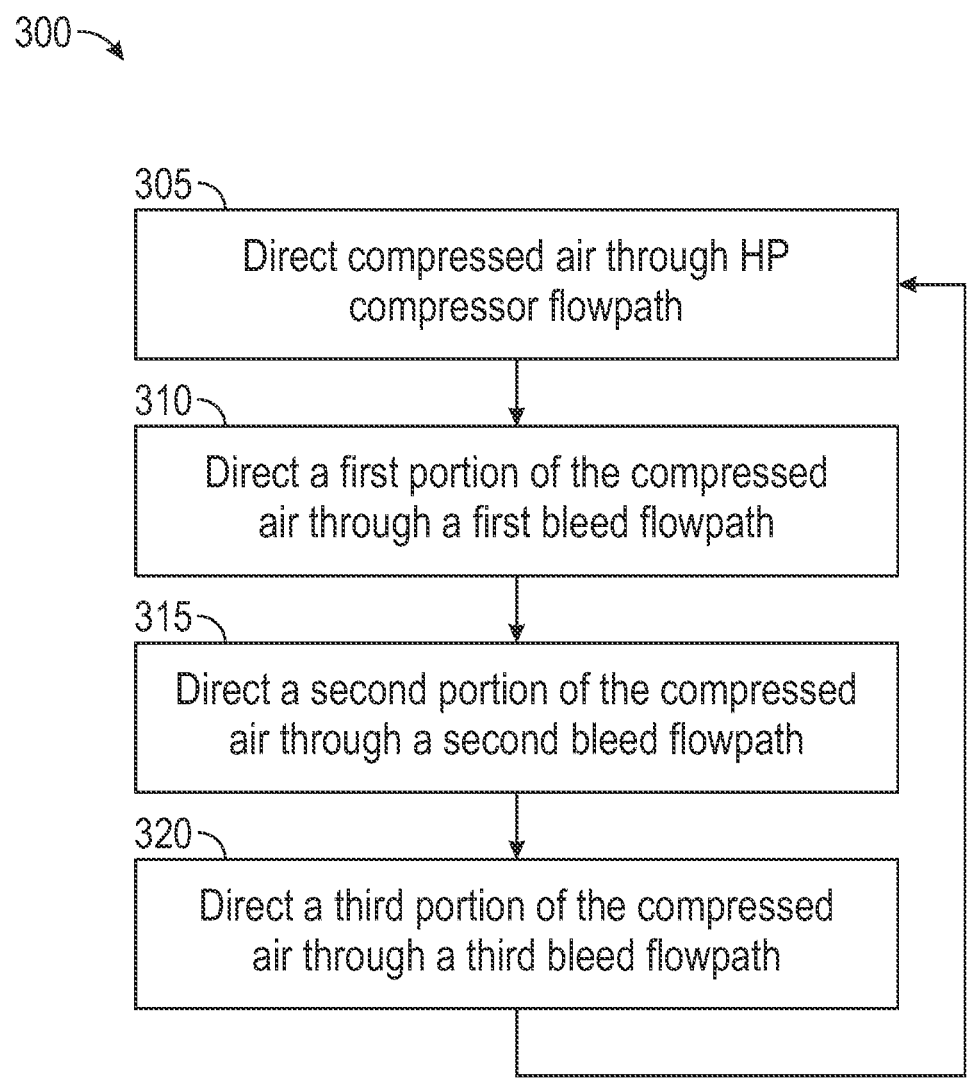
FIG. 3 is a flow diagram of a method of operating the turbine engine of FIGS. 1 and 2, according to the present disclosure.

FIG. 3 is a flow diagram of a method 300 of operating the turbine engine 10, according to the present disclosure. The turbine engine 10 operates as detailed above in FIG. 1. In this way, the compressed air 65 is directed from the LP compressor 22 to the HP compressor 24.

With reference to FIG. 2, in step 305, the method 300 includes directing the compressed air 65 through the HP compressor flowpath 102. For example, the HP compressor 24 directs the compressed air 65 through the HP compressor flowpath 102 by rotation of the HP compressor rotor blades 106. As the compressed air 65 progresses downstream within the HP compressor flowpath 102, the one or more stages 104 progressively compress the compressed air 65 further. In this way, a pressure of the compressed air 65 increases as the compressed air 65 progresses through the HP compressor 24.

In step 310, the method 300 includes directing a first portion of the compressed air 65 through the first bleed flowpath 140. For example, the first portion of the compressed air is directed through the first bleed port 120a, through the first bleed plenum 114a, and through the first bleed outlet 122a. The first portion of the compressed air 65 is then directed to the one or more aircraft systems 130. For example, the first portion of the compressed air 65 is used in at least one of an environmental control system or a wing anti-icing system for an aircraft.

In step 315, the method 300 includes directing a second portion of the compressed air 65 through the second bleed flowpath 142. For example, the second portion of the compressed air 65 is directed through the second bleed port 120b, through the second bleed plenum 114b, and through the second bleed outlet 122b. The flexible seal 116 prevents the second portion of the compressed air 65 from entering the first bleed plenum 114a, and prevents the first portion of the compressed air 65 from entering the second bleed plenum 114b. The second portion of the compressed air 65 is then directed to the LP turbine 30 for cooling a portion of the LP turbine 30.

In step 320, the method 300 includes directing a third portion of the compressed air 65 through the third bleed flowpath 144. For example, the third portion of the compressed air 65 is directed through the third bleed port 120c, through the third bleed plenum 114c, and through the third bleed outlet 122c. The rigid support member 118 prevents the third portion of the compressed air 65 from entering the second bleed plenum 114b, and prevents the second portion of the compressed air 65 from entering the third bleed plenum 114c. In this way, the first bleed plenum 114a, the second bleed plenum 114b, and the third bleed plenum 114c are fluidly separate, and the first bleed flowpath 140, the second bleed flowpath 142, and the third bleed flowpath 144 are fluidly separate. The third portion of the compressed air 65 is then directed to the HP turbine 28 for cooling a portion of the HP turbine 28.

Accordingly, the method 300 includes directing the compressed air 65 through at least the three bleed flowpaths 140, 142, and 144. At least two of the bleed flowpaths 140, 142, and 144 are at successive stages 104 of the HP compressor 24. For example, the first bleed flowpath 140 is at the third stage 104a, and the second bleed flowpath 142 is at the fourth stage 104b. The third bleed flowpath 144 is at the sixth stage 104c. The bleed flowpaths 140, 142, and 144, however, can be at any stage 104 of the HP compressor 24, such that at least two of the bleed flowpaths 140, 142, and 144 are at successive stages 104. Further, the at least three bleed flowpaths 140, 142, 144 can be arranged in any order, so long as at least two of the bleed flowpaths 140, 142, 144 are at successive stages 104 of the HP compressor 24. For example, the first bleed flowpath 140 can be at the fourth stage 104b and the second bleed flowpath 142 can be at the third stage 104a. In this way, the first bleed flowpath 140 directs the first portion of the compressed air 65 from the fourth stage 104b to the one or more aircraft systems 130 and the second bleed flowpath 142 directs the second portion of the compressed air 65 from the third stage 104a to the low-pressure turbine 30.

Providing at least two of the bleed flowpaths 140, 142, and 144 at successive stages 104 allows for improved fuel burn by supplying higher pressure air to the LP turbine 30 (e.g., from the fourth stage 104b) to achieve a positive back flow margin to prevent hot gas path ingestion in the LP turbine 30. Further, providing at least two of the bleed flowpaths 140, 142, and 144 at successive stages 104 also allows for providing the aircraft systems 130 with lower pressure air that is less costly for fuel burn due to less work being done on the flow at the third stage 104a as compared to bleed ports that are at more downstream stages 104.

The separate bleed flowpaths 140, 142, and 144 allow for directing the bleed air to various systems at various pressures and temperatures. In this way, the bleed air is directed to the LP turbine 30 separately (e.g., at a different pressure and at a different temperature) from the bleed air that is directed to the one or more aircraft systems 130. Thus, the bleed system 100 provides bleed air to the various systems of the turbine engine 10 or the aircraft, without overly sacrificing performance of the HP compressor 24.

In some embodiments, the method 300 includes directing a fourth portion of the compressed air 65 through the fourth bleed flowpath 146. For example, the fourth portion of the compressed air 65 is directed through the fourth bleed port 120d, through the fourth bleed plenum 114d (e.g., the post diffuser flowpath), and through the fourth bleed outlet 122d. The fourth portion of the compressed air 65 is then directed to at least one of the HP turbine 28 or the one or more aircraft systems 130 (e.g., to the environmental control system).

Figure 4:
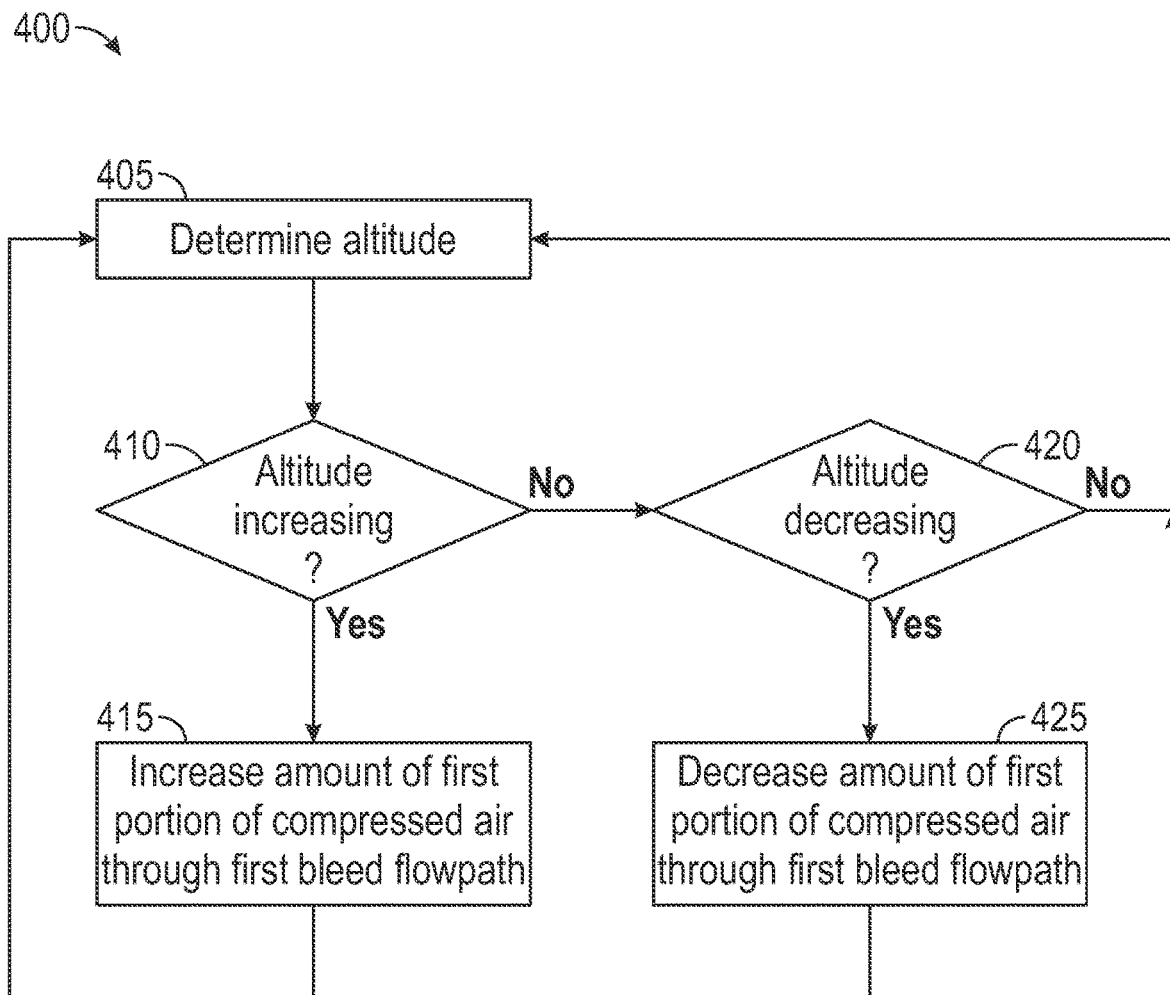
FIG. 4 is a flow diagram of a method of operating the turbine engine of FIGS. 1 and 2, according to another embodiment.

FIG. 4 is a flow diagram of a method 400 of operating the turbine engine 10, according to another embodiment. In step 405, the method 400 includes determining an altitude of the turbine engine 10. For example, the aircraft can include one or more altitude sensors, such as, for example, an altimeter, a barometric pressure sensor, temperature sensors, or the like, for providing an indication of the altitude of the turbine engine 10. The controller 90 receives the indication of the altitude from the one or more altitude sensors and determines the altitude based on the indication of the altitude from the one or more altitude sensors.

In step 410, the method 400 includes determining whether the altitude of the turbine engine 10 is increasing. In step 415, if the altitude of the turbine engine 10 is increasing (step 410: YES), the method 400 includes increasing an amount of the first portion of the compressed air 65 through the first bleed flowpath 140. For example, the controller 90 controls the first bleed flowpath valve 141 to modulate the first bleed flowpath valve 141 to allow more of the compressed air 65 through the first bleed flowpath 140 and to the one or more aircraft systems 130. In this way, the method 400 includes increasing the amount of the first portion of the compressed air 65 through the first bleed flowpath 140 as the altitude of the turbine engine 10 increases. The amount of the first portion of the compressed air 65 is measured by a first mass flow $W_{first\_bleed}$ of the first portion of the compressed air 65 through the first bleed flowpath 140. Thus, the method 400 includes increasing the first mass flow $W_{first\_bleed}$ of the first portion of the compressed air 65 through the first bleed flowpath 140 as the altitude of the turbine engine 10 increases. Accordingly, the amount of the first portion of the compressed air 65 (e.g., the first mass flow $W_{first\_bleed}$) directed to the one or more aircraft systems 130 increases as the altitude increases.

In step 420, if the altitude of the turbine engine 10 is decreasing (step 410: NO), the method 400 includes determining whether the altitude of the turbine engine 10 is decreasing. If the altitude of the turbine engine 10 is not decreasing (step 420: NO), the method 400 continues to step 405 to determine the altitude of the turbine engine 10. In step 425, if the altitude of the turbine engine 10 is decreasing (step 420: YES), the method 400 includes decreasing an amount of the first portion of the compressed air 65 through the first bleed flowpath 140. For example, the controller 90 controls the first bleed flowpath valve 141 to modulate the first bleed flowpath valve 141 to allow less of the compressed air 65 through the first bleed flowpath 140 and to the one or more aircraft systems 130. In this way, the method 400 includes decreasing the amount of the first portion of the compressed air 65 through the first bleed flowpath 140 as the altitude of the turbine engine 10 decreases. Thus, the method 400 includes decreasing the first mass flow $W_{first\_bleed}$ of the first portion of the compressed air 65 through the first bleed flowpath 140 as the altitude of the turbine engine 10 decreases. Accordingly, the amount of the first portion of the compressed air 65 (e.g., the first mass flow $W_{first\_bleed}$) directed to the one or more aircraft systems 130 decreases as the altitude decreases.

Accordingly, the method 400 includes changing the amount of the first portion of the compressed air 65 (e.g., the first mass flow $W_{first\_bleed}$) through the first bleed flowpath 140 based on the altitude of the turbine engine 10. For example, the method 400 includes modulating the first bleed flowpath valve 141 to change the amount of the first portion of the compressed air 65 (e.g., the first mass flow $W_{first\_bleed}$) through the first bleed flowpath 140 based on the altitude of the turbine engine 10.

An amount of the second portion of the compressed air 65 through the second bleed flowpath 142 remains approximately constant as the altitude changes (e.g., increases or decreases). The amount of the second portion of the compressed air 65 is measured by a second mass flow $W_{second\_bleed}$ of the second portion of the compressed air 65 through the second bleed flowpath 142. Thus, the second mass flow $W_{second\_bleed}$, as a fraction of a total amount of the compressed air 65 through the HP compressor flowpath 102, remains approximately constant as the altitude changes (e.g., increases or decreases). Accordingly, the amount of the second portion of the compressed air 65 (e.g., the second mass flow $W_{second\_bleed}$) directed to the low-pressure turbine 30, as a fraction of the total amount of the compressed air 65 through the HP compressor flowpath 102, remains approximately constant as the altitude changes (e.g., increases or decreases). Further, a mass flow ratio of the first mass flow $W_{first\_bleed}$ to the second mass flow $W_{second\_bleed}$ increases as the altitude increases and decreases as the altitude decreases, as detailed further below.

In some embodiments, the method 400 proceeds after the altitude has increased to be greater than an altitude threshold. In one non-limiting example, the altitude threshold is six thousand feet (6,000 ft.). The first mass flow $W_{first\_bleed}$ is approximately constant when the altitude is less than the altitude threshold. Accordingly, the method 400 proceeds when the altitude is greater than the altitude threshold such that the amount of the first portion of the compressed air 65 changes as the altitude changes, as detailed above.

In one non-limiting embodiment, the fourth bleed flowpath 146 provides the fourth portion of the compressed air 65 to the one or more aircraft systems 130 until a pressure at the first bleed flowpath 140 is greater than a pressure threshold. For example, the fourth bleed flowpath valve 147 is opened when the pressure of the first bleed flowpath 140 is less than or equal to the pressure threshold such that the fourth portion of the compressed air 65 flows through the fourth bleed flowpath 146 and to the one or more aircraft systems 130. The first bleed flowpath valve 141 is closed when the pressure of the first bleed flowpath 140 is less than or equal to the pressure threshold such that the compressed air 65 is prevented from flowing through the first bleed flowpath 140 when the pressure is less than or equal to the pressure threshold. The fourth bleed flowpath valve 147 closes and the first bleed flowpath valve 141 opens when the pressure of the first bleed flowpath 140 is greater than the pressure threshold. For example, the controller 90 controls the fourth bleed flowpath valve 147 to close the fourth bleed flowpath valve 147 and controls the first bleed flowpath valve 141 to open the first bleed flowpath valve 141. In this way, the compressed air 65 is prevented from flowing through the fourth bleed flowpath 146 and the first portion of the compressed air 65 flows through the first bleed flowpath 140 and to the one or more aircraft systems 130. The pressure of the first bleed flowpath 140 increases to greater than the pressure threshold when the turbine engine 10 transitions from idle conditions to takeoff conditions. Thus, the first portion of the compressed air 65 begins to flow through the first bleed flowpath 140 to the one or more aircraft systems 130 when the turbine engine 10 transitions from idle conditions to takeoff conditions.

Figure 5:
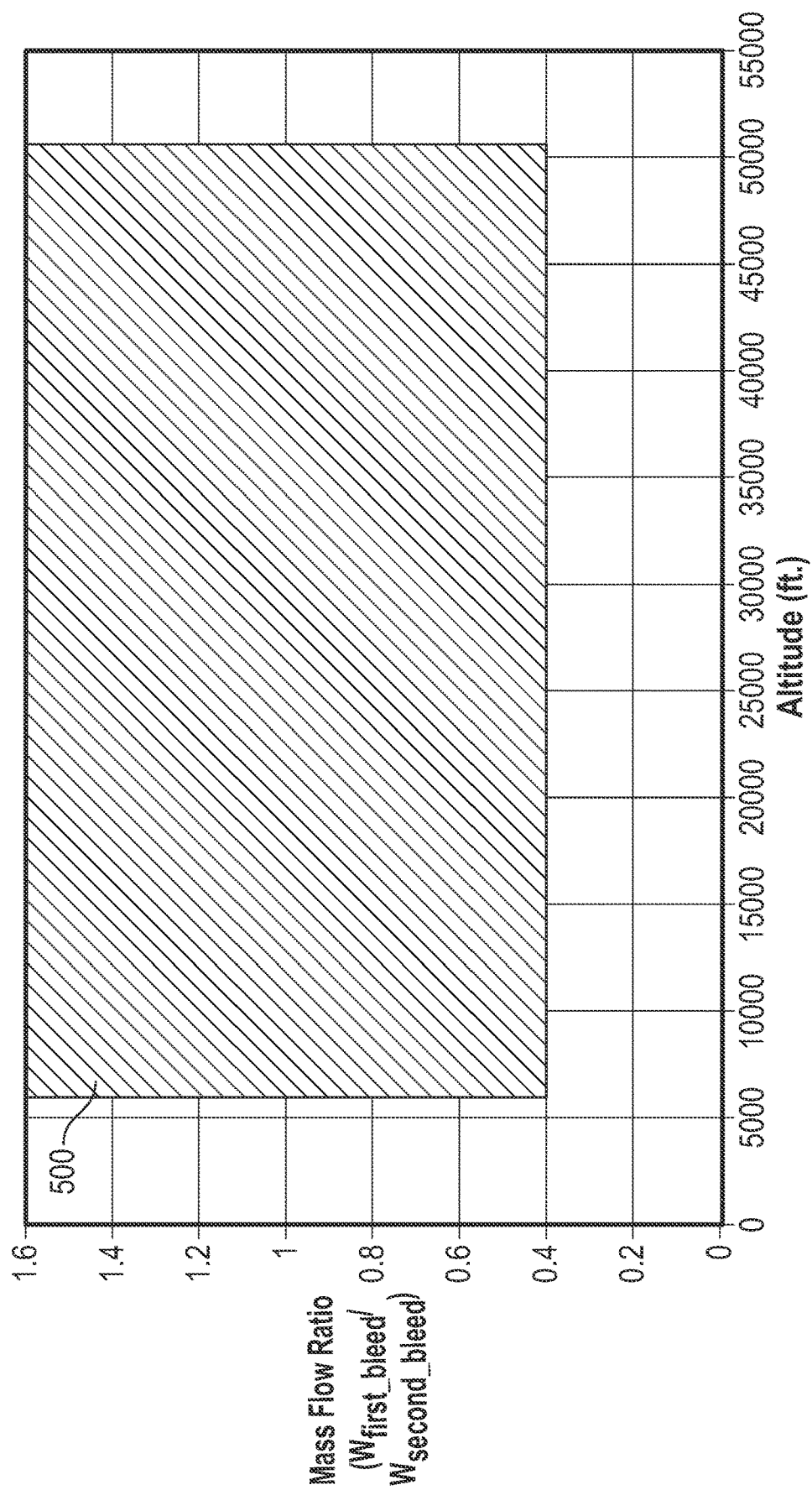
FIG. 5 represents, in graph form, a mass flow ratio of a first mass flow $W_{first\_bleed}$ through a first bleed flowpath to a second mass flow $W_{second\_bleed}$ through a second bleed flowpath as a function of an altitude of the turbine engine of FIG. 1, according to the present disclosure

FIG. 5 represents, in graph form, a mass flow ratio of the first mass flow $W_{first\_bleed}$ to the second mass flow $W_{second\_bleed}$ as a function of the altitude of the turbine engine 10, according to the present disclosure. An area 500 represents exemplary boundaries of the mass flow ratio and the altitude. In one non-limiting example, the altitude is in a range of six thousand feet to fifty-one thousand feet (6,000 ft. to 51,000 ft.), and the mass flow ratio is in a range of zero point four to one point six (0.40 to 1.60). The mass flow ratio increases as the altitude increases from takeoff altitude (e.g., 0 feet) to cruise altitude (e.g., 38,000 feet to 51,000 feet). In the non-limiting exemplary embodiment, the mass flow ratio is in a range of 0.40 to 0.60 at zero feet (0 ft.), is in a range of 0.60 to 0.72 at twelve thousand feet (12,000 ft.), is in a range of 0.75 to 0.91 at nineteen thousand eight hundred feet (19,800 ft.), is in a range of 1.17 to 1.44 at thirty-five thousand feet (35,000 ft.), is in a range of 1.20 to 1.47 at thirty-eight thousand feet (38,000 ft.), and is in a range of 1.47 to 1.60 at fifty-one thousand feet (51,000 ft.).

The ranges of the mass flow ratio for the various altitudes are exemplary only, and the ranges of the mass flow ratio and the values of the altitudes can vary for a particular size of the turbine engine 10 or a particular size of the aircraft on which the turbine engine 10 is mounted. For example, larger aircraft require more flow through the first bleed flowpath 140 to the one or more aircraft systems 130. The ranges and the values of the mass flow ratio and the altitude will also vary based on a number of the stages 104 of the HP compressor 24 and based on a particular stage 104 to which the first bleed flowpath 140 and the second bleed flowpath 142 are coupled. For example, various stages 104 will provide various pressures through the first bleed flowpath 140 and the second bleed flowpath 142 and will require various mass flows through first bleed flowpath 140 and the second bleed flowpath 142 to achieve the required flows to the one or more aircraft systems 130 and to the LP turbine 30, respectively. The values and the ranges of the mass flow ratio and the altitude will also vary based on a number of stages of the LP turbine 30. For example, the flow required to the LP turbine 30 from the second bleed flowpath 142 will vary based on the number of stages of the LP turbine 30. In some embodiments, the values and the ranges of the mass flow ratio and the altitude will vary based on a particular configuration of the turbine engine 10 or the aircraft. For example, the values and the ranges of the mass flow ratio and the altitude will vary if the aircraft includes a separate compressor for cabin pressure, and, thus, the mass flow through the first bleed flowpath is lower compared to aircraft without the separate compressor for cabin pressure. The values and the ranges of the mass flow ratio and the altitude will also vary if the bleed system 100 provides the portion of the compressed air to the HP turbine 28 and the LP turbine 30 from the same stage 104 of the HP compressor 24, and, thus, the mass flow through the second bleed flowpath 142 is high compared to turbine engines that have separate bleed flowpaths to the HP turbine 28 and the LP turbine 30.

As noted above, the first bleed flowpath 140 and the second bleed flowpath 142 can be flipped such that the first bleed flowpath 140 is at a downstream stage of the second bleed flowpath 142. For example, the first bleed flowpath 140 can be at the fourth stage 104b and the second bleed flowpath 142 can be at the third stage 104a. In such a configuration, the first bleed flowpath 140 directs the first portion of the compressed air 65 from the fourth stage 104b to the one or more aircraft systems 130 and the second bleed flowpath 142 directs the second portion of the compressed air 65 from the third stage 104a to the low-pressure turbine 30. In this way, the mass flow ratio is the ratio of the second mass flow $W_{second\_bleed}$ to the first mass flow $W_{first\_bleed}$, and the mass flow ratio decreases as the altitude increases. For example, the mass flow ratio decreases as the amount of the first portion of the compressed air 65 (e.g., the first mass flow $W_{first\_bleed}$) increases. In such configurations, the mass flow ratio decreases as the altitude increases from takeoff altitude (e.g., 0 feet) to cruise altitude (e.g., 38,000 feet to 51,000 feet). For example, the mass flow ratio is in a range of 1.47 to 1.60 at zero feet (0 ft.), is in a range of 1.20 to 1.47 at twelve thousand feet (12,000 ft.), is in a range of 1.17 to 1.44 at nineteen thousand eight hundred feet (19,800 ft.), is in a range of 0.75 to 0.91 a thirty-five thousand feet (35,000 ft.), is in a range of 0.60 to 0.72 at thirty-eight thousand feet (38,000 ft.), and is in a range of 0.40 to 0.60 at fifty-one thousand feet (51,000 ft.). The ranges of the mass flow ratio for the various altitudes are exemplary only, and the ranges of the mass flow ratio and the values of the altitudes can vary, as detailed above.

Accordingly, the bleed system 100 of the present disclosure allows for independent control of the bleed air to the one or more aircraft systems 130, the LP turbine 30, and the HP turbine 28. The bleed system 100 provides for at least two of the bleed flowpaths 140, 142, and 144 being at successive stages 104 of the HP compressor 24 (e.g., the third stage and the fourth stage) to provide high efficiency bleed air to the one or more aircraft systems 130. Providing at least two of the bleed flowpaths 140, 142, and 144 at successive stages 104 in such a way allows for the bleed system 100 of the HP compressor 24 to meet the required back flow margins and the low-pressure turbine inducer pressure ratio requirements for a particular turbine engine 10. Further, modulating the amount of the first portion of the compressed air 65 based on the altitude of the turbine engine 10 helps to achieve a desired amount of the compressed air 65 to the one or more aircraft systems 130, while also reducing an amount of the compressed air 65 that needs to be bled from the HP compressor 24 due to the separate flowpaths to the one or more aircraft systems 130 and to the low-pressure turbine 30, as compared to turbine engines without the benefit of the present disclosure.

Further aspects of the present disclosure are provided by the subject matter of the following clauses.

A turbine engine comprises a high-pressure compressor including a high-pressure compressor flowpath and a plurality of stages of high-pressure compressor rotor blades and high-pressure compressor stator vanes, and a bleed system comprising a plurality of bleed flowpaths including at least three bleed flowpaths in fluid communication with the high-pressure compressor flowpath, the plurality of bleed flowpaths directing compressed air from the high-pressure compressor flowpath, at least two of the bleed flowpaths being at successive stages of the plurality of stages.

The turbine engine of the preceding clause, the plurality of bleed flowpaths including a first bleed flowpath at a third stage of the plurality of stages, a second bleed flowpath at a fourth stage of the plurality of stages, and a third bleed flowpath at a sixth stage of the plurality of stages.

The turbine engine of any preceding clause, the plurality of bleed flowpaths including a first bleed flowpath directed to one or more aircraft systems, a second bleed flowpath directed to a low-pressure turbine of the turbine engine, and a third bleed flowpath directed to an HP turbine of the turbine engine.

The turbine engine of any preceding clause, the plurality of bleed flowpaths including a fourth bleed flowpath at a high-pressure compressor diffuser of the high-pressure compressor directed to at least one of the one or more aircraft systems or the low-pressure turbine.

The turbine engine of any preceding clause, the high-pressure compressor further comprising an outer high-pressure compressor casing and an inner high-pressure compressor casing, and the bleed system further comprises one or more bleed plenums defined between the outer high-pressure compressor casing and the inner high-pressure compressor casing, the one or more bleed plenums defining a portion of the plurality of bleed flowpaths.

The turbine engine of any preceding clause, the one or more bleed plenums including a first bleed plenum defining a first bleed flowpath, a second bleed plenum defining a second bleed flowpath, and a third bleed plenum defining a third bleed flowpath.

The turbine engine of any preceding clause, further comprising a flexible seal that separates the first bleed plenum and the second bleed plenum such that the first bleed flowpath is fluidly separate from the second bleed flowpath.

The turbine engine of any preceding clause, further comprising a rigid support member that separates the second bleed plenum and the third bleed plenum such that the second bleed flowpath is fluidly separate from the third bleed flowpath.

The turbine engine of any preceding clause, further comprising a plurality of bleed ports disposed through the inner high-pressure compressor casing and a plurality of bleed outlets disposed through the outer high-pressure compressor casing, the plurality of bleed ports and the plurality of bleed outlets being in fluid communication with the one or more bleed plenums.

The turbine engine of any preceding clause, the plurality of bleed ports and the plurality of bleed outlets being sized and located in the high-pressure compressor such that the first bleed flowpath recovers more than 10% of a dynamic pressure of the first bleed flowpath into a static pressure within the first bleed flowpath.

The turbine engine of any preceding clause, the plurality of bleed ports and the plurality of bleed outlets being sized and located in the high-pressure compressor such that a pressure ratio of a total pressure of the second bleed flowpath ($P_{second\_bleed}$) to a total pressure of the first bleed flowpath ($P_{first\_bleed}$) is less than a pressure ratio of a stage at which the second bleed flowpath is located.

The turbine engine of any preceding clause, the plurality of bleed ports and the plurality of bleed outlets being sized and located in the high-pressure compressor such that the second bleed flowpath recovers less than 10% of a dynamic pressure of the second bleed flowpath into a static pressure of the second bleed flowpath.

The turbine engine of any preceding clause, the one or more aircraft systems including at least one of an environmental control system or a wing anti-icing system.

The turbine engine of any preceding clause, the high-pressure compressor comprising nine stages.

The turbine engine of any preceding clause, the high-pressure compressor rotor blades being coupled to a high-pressure shaft and rotating with rotation of the high-pressure shaft.

The turbine engine of any preceding clause, the high-pressure compressor stator vanes being coupled to the inner high-pressure compressor casing.

The turbine engine of any preceding clause, at least one of the plurality of bleed flowpaths extending axially between the high-pressure compressor stator vanes of one stage of the plurality of stages.

The turbine engine of any preceding clause, the flexible seal being made of a metallic material that is resistant to temperatures up to at least 1000° F.

The turbine engine of any preceding clause, the flexible seal being made of at least one of a titanium alloy, a nickel-chromium alloy, or steel.

A bleed system for a turbine engine including a high-pressure compressor having a high-pressure compressor flowpath and a plurality of stages, the bleed system comprising a plurality of bleed flowpaths including at least three bleed flowpaths in fluid communication with the high-pressure compressor flowpath of the high-pressure compressor, the plurality of bleed flowpaths directing compressed air from the high-pressure compressor flowpath, at least two of the bleed flowpaths being at successive stages of the plurality of stages of the high-pressure compressor.

The bleed system of the preceding clause, the plurality of bleed flowpaths including a first bleed flowpath at a third stage of the plurality of stages, a second bleed flowpath at a fourth stage of the plurality of stages, and a third bleed flowpath at a sixth stage of the plurality of stages.

The bleed system of any preceding clause, the plurality of bleed flowpaths including a first bleed flowpath directed to one or more aircraft systems, a second bleed flowpath directed to a low-pressure turbine of the turbine engine, and a third bleed flowpath directed to a high-pressure turbine of the turbine engine.

The bleed system of any preceding clause, the plurality of bleed flowpaths including a fourth bleed flowpath at a high-pressure compressor diffuser of the high-pressure compressor directed to at least one of the one or more aircraft systems or the low-pressure turbine.

The bleed system of any preceding clause, the high-pressure compressor including an outer high-pressure compressor casing and an inner high-pressure compressor casing, the bleed system further comprising one or more bleed plenums defined between the outer high-pressure compressor casing and the inner high-pressure compressor casing of the high-pressure compressor, the one or more bleed plenums defining a portion of the plurality of bleed flowpaths.

The bleed system of any preceding clause, the one or more bleed plenums include a first bleed plenum defining a first bleed flowpath, a second bleed plenum defining a second bleed flowpath, and a third bleed plenum defining a third bleed flowpath.

The bleed system of any preceding clause, further comprising a flexible seal that separates the first bleed plenum and the second bleed plenum such that the first bleed flowpath is fluidly separate from the second bleed flowpath.

The bleed system of any preceding clause, further comprising a rigid support member that separates the second bleed plenum and the third bleed plenum such that the second bleed flowpath is fluidly separate from the third bleed flowpath.

The bleed system of any preceding clause, further comprising a plurality of bleed ports disposed through the inner high-pressure compressor casing and a plurality of bleed outlets disposed through the outer high-pressure compressor casing, the plurality of bleed ports and the plurality of bleed outlets being in fluid communication with the one or more bleed plenums.

The bleed system of the preceding clause, the plurality of bleed ports and the plurality of bleed outlets being sized and located in the high-pressure compressor such that the first bleed flowpath recovers more than 10% of a dynamic pressure of the first bleed flowpath into a static pressure within the first bleed flowpath.

The bleed system of any preceding clause, the plurality of bleed ports and the plurality of bleed outlets are sized and located in the high-pressure compressor such that a pressure ratio of a total pressure of the second bleed flowpath ($P_{second\_bleed}$) to a total pressure of the first bleed flowpath ($P_{first\_bleed}$) is less than a pressure ratio of a stage at which the second bleed flowpath is located.

The bleed system of any preceding clause, the plurality of bleed ports and the plurality of bleed outlets being sized and located in the high-pressure compressor such that the second bleed flowpath recovers less than 10% of the dynamic pressure of the second bleed flowpath into a static pressure within the second bleed flowpath.

The bleed system of any preceding clause, a second bleed flowpath recovery ratio of the second bleed flowpath being lower than a first bleed flowpath recovery ratio of the first bleed flowpath.

The bleed system of any preceding clause, the one or more aircraft systems including at least one of an environmental control system or a wing anti-icing system.

The bleed system of any preceding clause, the high-pressure compressor comprising nine stages.

The bleed system of any preceding clause, the high-pressure compressor rotor blades being coupled to a high-pressure shaft and rotating with rotation of the high-pressure shaft.

The bleed system of any preceding clause, the high-pressure compressor stator vanes being coupled to the inner high-pressure compressor casing.

The bleed system of any preceding clause, the plurality of stages of the high-pressure compressor each including high-pressure compressor rotor blades and high-pressure compressor stator vanes.

The bleed system of any preceding clause, at least one of the plurality of bleed flowpaths extending axially between the high-pressure compressor stator vanes of one stage of the plurality of stages.

The bleed system of any preceding clause, the flexible seal being made of a metallic material that is resistant to temperatures up to at least 1000° F.

The bleed system of any preceding clause, the flexible seal being made of at least one of a titanium alloy, a nickel-chromium alloy, or steel.

A method of operating the turbine engine of any preceding clause, the method comprising directing compressed air through the high-pressure compressor flowpath, directing a first portion of the compressed air through a first bleed flowpath of the plurality of bleed flowpaths, directing a second portion of the compressed air through a second bleed flowpath of the plurality of bleed flowpaths, and directing a third portion of the compressed air through a third bleed flowpath of the plurality of bleed flowpaths.

The method of the preceding clause, the turbine engine including an inner high-pressure compressor casing and an outer high-pressure compressor casing, and the method further comprises directing the first portion of the compressed air through a first bleed port in the inner high-pressure compressor casing of the high-pressure compressor, through a first bleed plenum defined between the inner high-pressure compressor casing and the outer high-pressure compressor casing, and through a first bleed outlet in the outer high-pressure compressor casing of the high-pressure compressor, directing the second portion of the compressed air through a second bleed port in the inner high-pressure compressor casing, through a second bleed plenum defined between the inner high-pressure compressor casing and the outer high-pressure compressor casing, and through a second bleed outlet in the outer high-pressure compressor casing, and directing the third portion of the compressed air through a third bleed port in the inner high-pressure compressor casing, through a third bleed plenum defined between the inner high-pressure compressor casing and the outer high-pressure compressor casing, and through a third bleed outlet in the outer high-pressure compressor casing.

The method of any preceding clause, the turbine engine including a third stage of the plurality of stages, a fourth stage of the plurality of stages, and a sixth stage of the plurality of stages, and the method further comprises directing the first portion of the compressed air from the third stage of the plurality of stages through the first bleed flowpath, directing the second portion of the compressed air from the fourth stage of the plurality of stages through the second bleed flowpath, and directing the third portion of the compressed air from the sixth stage of the plurality of stages through the third bleed flowpath.

The method of any preceding clause, the first bleed flowpath recovering more than 10% of a dynamic pressure of the first bleed flowpath into a static pressure within the first bleed flowpath.

The method of any preceding clause, a pressure ratio of a total pressure of the second bleed flowpath ($P_{second\_bleed}$) to a total pressure of the first bleed flowpath ($P_{first\_bleed}$) being less than a pressure ratio of a stage at which the second bleed flowpath is located.

The method of any preceding clause, the second bleed flowpath recovering less than 10% of a dynamic pressure of the second bleed flowpath into a static pressure of the second bleed flowpath.

The method of any preceding clause, further comprising directing the first portion of the compressed air to one or more aircraft systems, directing the second portion of the compressed air to a low-pressure turbine of the turbine engine, and directing the third portion of the compressed air to a high-pressure turbine of the turbine engine.

The method of any preceding clause, the high-pressure compressor including a high-pressure compressor diffuser, and the method further comprises directing a fourth portion of the compressed air from the high-pressure compressor diffuser of the high-pressure compressor, and directing the fourth portion of the compressed air to at least one of the one or more aircraft systems or the low-pressure turbine.

The method of any preceding clause, the one or more aircraft systems including at least one of an environmental control system or a wing anti-icing system.

The method of any preceding clause, the high-pressure compressor comprising nine stages.

The method of any preceding clause, the high-pressure compressor rotor blades being coupled to a high-pressure shaft and rotating with rotation of the high-pressure shaft.

The method of any preceding clause, the high-pressure compressor stator vanes being coupled to the inner high-pressure compressor casing.

The method of any preceding clause, the bleed system further comprising a flexible seal that separates the first bleed plenum and the second bleed plenum such that the first bleed flowpath is fluidly separate from the second bleed flowpath.

The method of any preceding clause, at least one of the plurality of bleed flowpaths extending axially between the high-pressure compressor stator vanes of one stage of the plurality of stages.

The method of any preceding clause, the flexible seal being made of a metallic material that is resistant to temperatures up to at least 1000° F.

The method of any preceding clause, the flexible seal being made of at least one of a titanium alloy, a nickel-chromium alloy, or steel.

The method of any preceding clause, the bleed system further comprising a rigid support member that separates the second bleed plenum and the third bleed plenum such that the second bleed flowpath is fluidly separate from the third bleed flowpath.

A method of operating a turbine engine having a high-pressure compressor including a high-pressure compressor flowpath and a plurality of stages of high-pressure compressor rotor blades and high-pressure compressor stator vanes, and a bleed system comprising a plurality of bleed flowpaths including a first bleed flowpath from one stage of the plurality of stages and a second bleed flowpath from another stage of the plurality of stages. The method comprises directing compressed air through the high-pressure compressor flowpath, directing a first portion of the compressed air through the first bleed flowpath, the first portion of the compressed air having a first mass flow, directing a second portion of the compressed air through the second bleed flowpath, the second portion of the compressed air having a second mass flow, determining an altitude of the turbine engine, and changing the first mass flow of the first portion of the compressed air through the first bleed flowpath based on the altitude of the turbine engine.

The method of the preceding clause, the second mass flow of the second portion of the compressed air as a fraction of the compressed air through the high-pressure compressor flowpath being approximately constant as the altitude changes.

The method of any preceding clause, the first bleed flowpath and the second bleed flowpath being at successive stages of the plurality of stages.

The method of any preceding clause, further comprising directing the first portion of the compressed air to one or more aircraft systems.

The method of any preceding clause, further comprising directing the second portion of the compressed air to a low-pressure turbine of the turbine engine.

The method of any preceding clause, a mass flow ratio of the first mass flow to the second mass flow increasing as the altitude increases.

The method of any preceding clause, the mass flow ratio of the first mass flow to the second mass flow decreasing as the altitude increases.

The method of any preceding clause, the first bleed flowpath including a first bleed flowpath valve, and the method further comprising controlling the first bleed flowpath valve to change the first mass flow of the first portion of the compressed air through the first bleed flowpath.

The method of the preceding clause, the first bleed flowpath valve being a modulating valve such that the first bleed flowpath valve can be modulated between a fully opened position and a fully closed positioned to control an amount of the first portion of the compressed air through the first bleed flowpath valve.

The method of any preceding clause, further comprising determining whether the altitude is increasing or decreasing.

The method of the preceding clause, changing the first mass flow including increasing the first mass flow of the first portion of the compressed air through the first bleed flowpath as the altitude increases.

The method of the preceding clause, wherein changing the first mass flow includes decreasing the first mass flow of the first portion of the compressed air through the first bleed flowpath as the altitude decreases.

The method of any preceding clause, the bleed system further comprising a third bleed flowpath from another stage of the plurality of stages, and the method further comprising directing a third portion of the compressed air through the third bleed flowpath.

The method of the preceding clause, the turbine engine further comprising a high-pressure turbine, and the method further comprising directing the third portion of the compressed air to the high-pressure turbine.

The method of the preceding clause, the high-pressure compressor further comprising a high-pressure compressor diffuser, the bleed system further comprising a fourth bleed flowpath from the high-pressure compressor diffuser, and the method further comprising directing a fourth portion of the compressed air through the fourth bleed flowpath.

The method of the preceding clause, further comprising directing the fourth portion of the compressed air to one or more aircraft systems.

The method of the preceding clause, the fourth bleed flowpath including a fourth bleed flowpath valve, and the method further comprising controlling the fourth bleed flowpath valve to open the fourth bleed flowpath valve to direct the fourth portion of the compressed air through the fourth bleed flowpath.

The method of the preceding clause, further comprising controlling the fourth bleed flowpath valve to close to prevent the fourth portion of the compressed air from flowing through the fourth bleed flowpath.

The method of any preceding clause, further comprising directing the fourth portion of the compressed air through the fourth bleed flowpath and preventing the first portion of the compressed air from flowing through the first bleed flowpath when the altitude is less than or equal to an altitude threshold.

The method of the preceding clause, further comprising directing the first portion of the compressed air through the first bleed flowpath and preventing the fourth portion of the compressed air from flowing through the fourth bleed flowpath when the altitude is greater than the altitude threshold.

The method of any preceding clause, the mass flow ratio of the first mass flow to the second mass flow being in a range of 0.40 to 1.60.

The method of any preceding clause, the altitude being in a range of 6,000 feet to 51,000 feet.

The method of any preceding clause, the turbine engine being the turbine engine of any preceding clause.

The method of any preceding clause, the bleed system being the bleed system of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A method of operating a turbine engine having a high-pressure compressor including a high-pressure compressor flowpath and a plurality of stages of high-pressure compressor rotor blades and high-pressure compressor stator vanes, and a bleed system comprising a plurality of bleed flowpaths including a first bleed flowpath from one stage of the plurality of stages and a second bleed flowpath from another stage of the plurality of stages, the method comprising:
directing compressed air through the high-pressure compressor flowpath;
directing a first portion of the compressed air through the first bleed flowpath, the first portion of the compressed air having a first mass flow;
directing a second portion of the compressed air through the second bleed flowpath, the second portion of the compressed air having a second mass flow;
determining an altitude of the turbine engine; and
changing the first mass flow of the first portion of the compressed air through the first bleed flowpath as the altitude of the turbine engine increases or decreases,
wherein a mass flow ratio of the first mass flow to the second mass flow is a first value at a first altitude, a second value at a second altitude, and a third value at a third altitude, the third altitude being greater than the second altitude, and the second altitude being greater than the first altitude.

2. The method of claim 1, wherein the second mass flow of the second portion of the compressed air as a fraction of the compressed air through the high-pressure compressor flowpath is approximately constant as the altitude changes.

3. The method of claim 1, wherein the first bleed flowpath and the second bleed flowpath are at successive stages of the plurality of stages.

4. The method of claim 1, further comprising directing the first portion of the compressed air to one or more aircraft systems.

5. The method of claim 1, further comprising directing the second portion of the compressed air to a low-pressure turbine of the turbine engine.

6. The method of claim 1, wherein a mass flow ratio of the first mass flow to the second mass flow increases as the altitude increases.

7. The method of claim 6, wherein the mass flow ratio of the first mass flow to the second mass flow decreases as the altitude decreases.

8. The method of claim 1, wherein the first bleed flowpath includes a first bleed flowpath valve, and the method further comprises controlling the first bleed flowpath valve to change the first mass flow of the first portion of the compressed air through the first bleed flowpath.

9. The method of claim 1, further comprising determining whether the altitude is increasing or decreasing.

10. The method of claim 9, wherein changing the first mass flow includes increasing the first mass flow of the first portion of the compressed air through the first bleed flowpath as the altitude increases.

11. The method of claim 9, wherein changing the first mass flow includes decreasing the first mass flow of the first portion of the compressed air through the first bleed flowpath as the altitude decreases.

12. The method of claim 1, wherein the bleed system further comprises a third bleed flowpath from another stage of the plurality of stages, and the method further comprises directing a third portion of the compressed air through the third bleed flowpath.

13. The method of claim 12, wherein the turbine engine further comprises a high-pressure turbine, and the method further comprises directing the third portion of the compressed air to the high-pressure turbine.

14. The method of claim 12, wherein the high-pressure compressor further comprises a high-pressure compressor diffuser, the bleed system further comprises a fourth bleed flowpath from the high-pressure compressor diffuser, and the method further comprises directing a fourth portion of the compressed air through the fourth bleed flowpath.

15. The method of claim 14, further comprising directing the fourth portion of the compressed air to one or more aircraft systems.

16. The method of claim 14, wherein the fourth bleed flowpath includes a fourth bleed flowpath valve, and the method further comprises controlling the fourth bleed flowpath valve to open the fourth bleed flowpath valve to direct the fourth portion of the compressed air through the fourth bleed flowpath.

17. The method of claim 16, further comprising controlling the fourth bleed flowpath valve to close to prevent the fourth portion of the compressed air from flowing through the fourth bleed flowpath.

18. The method of claim 14, further comprising directing the fourth portion of the compressed air through the fourth bleed flowpath and preventing the first portion of the compressed air from flowing through the first bleed flowpath when the altitude is less than or equal to an altitude threshold.

19. The method of claim 18, further comprising directing the first portion of the compressed air through the first bleed flowpath and preventing the fourth portion of the compressed air from flowing through the fourth bleed flowpath when the altitude is greater than the altitude threshold.

* * * * *